UNITED STATES PATENT OFFICE.

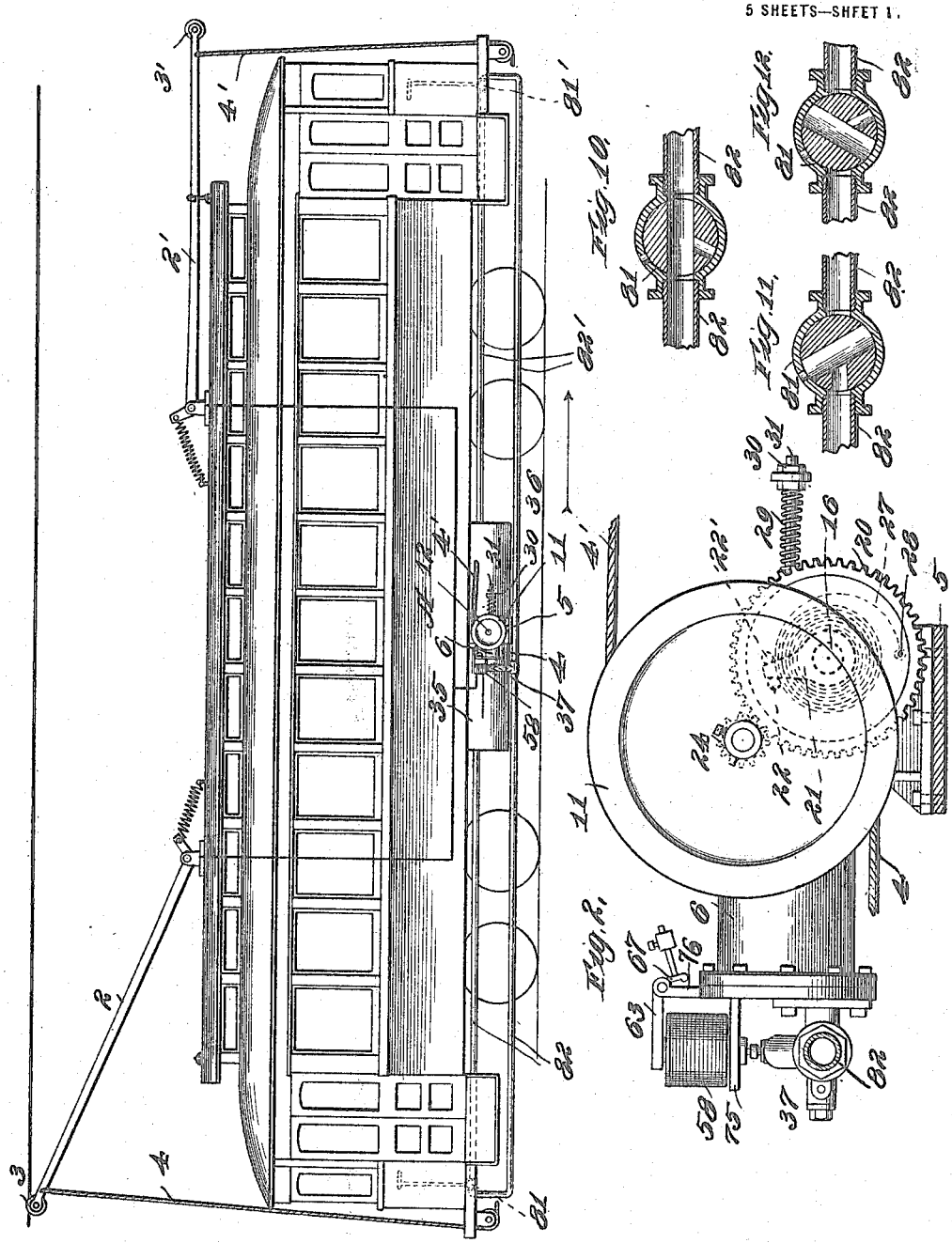

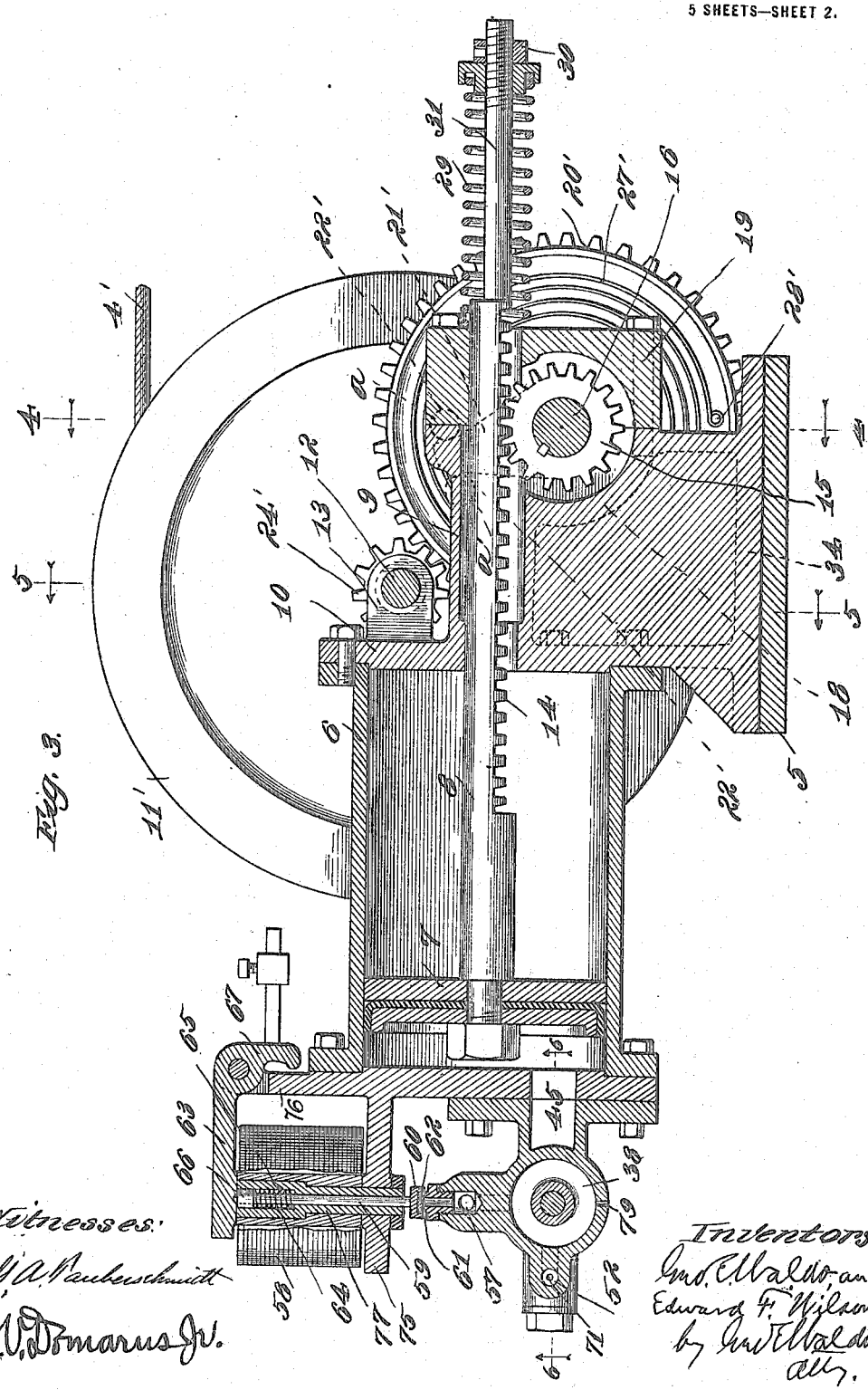

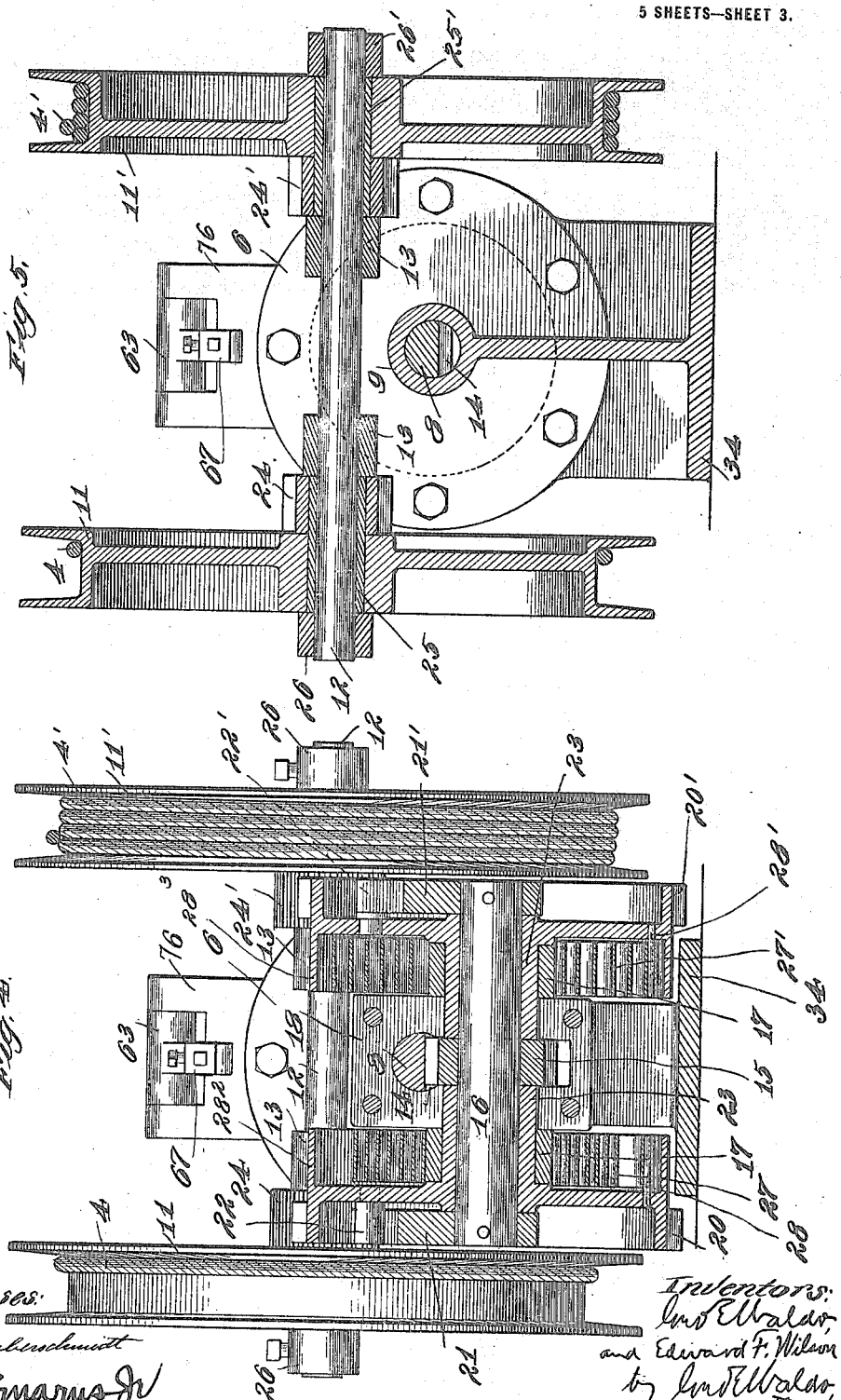

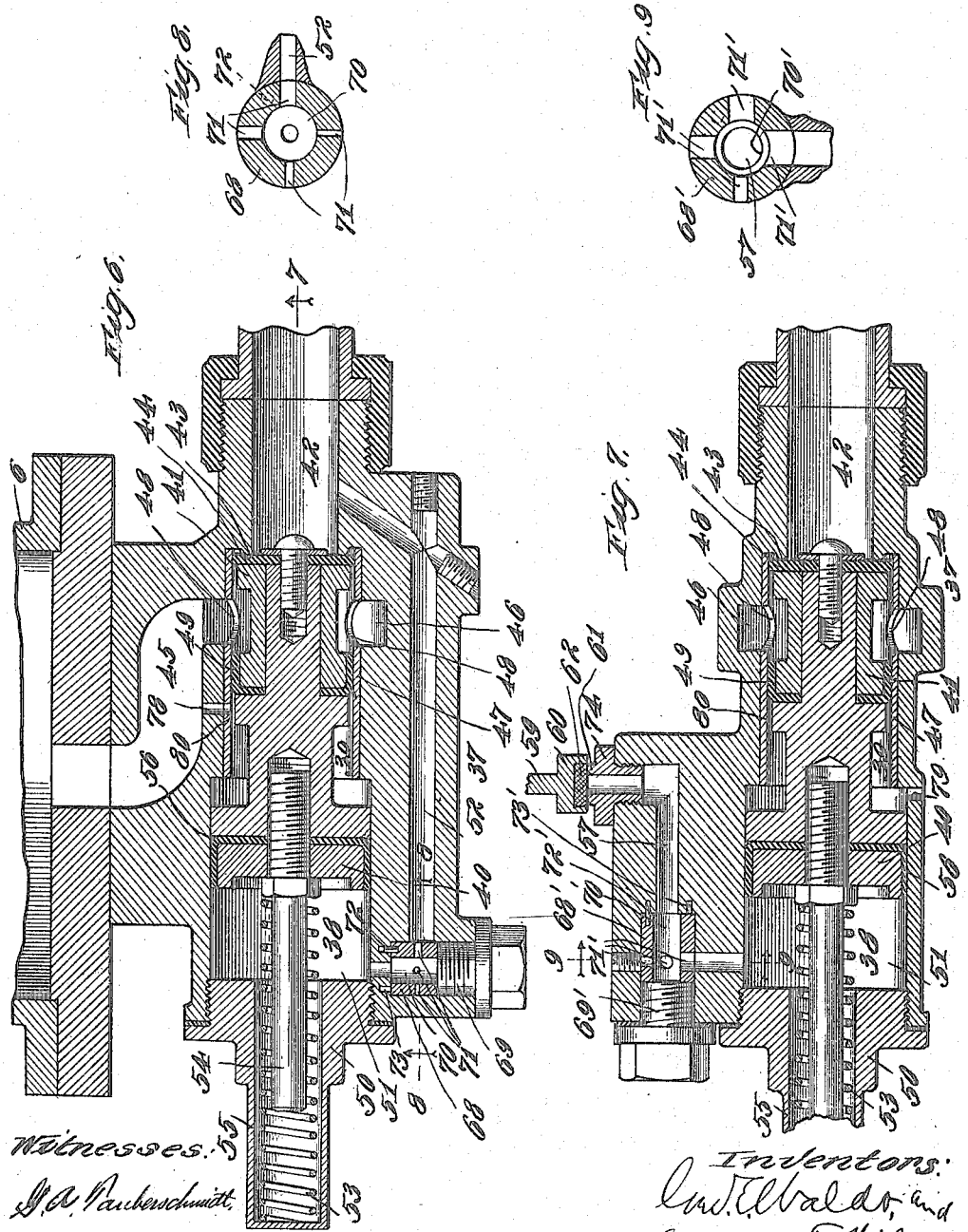

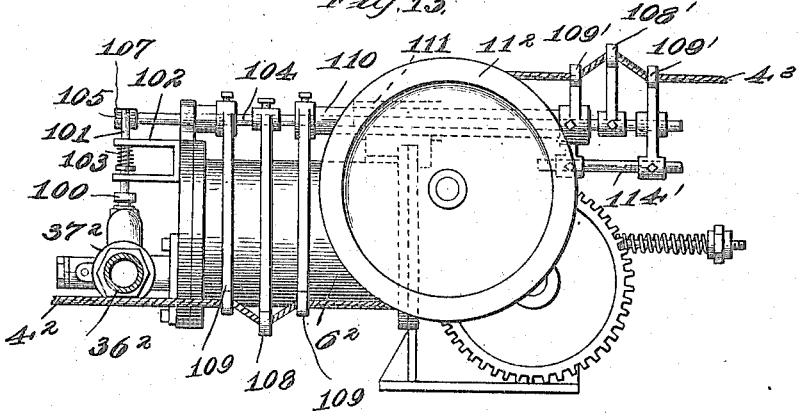
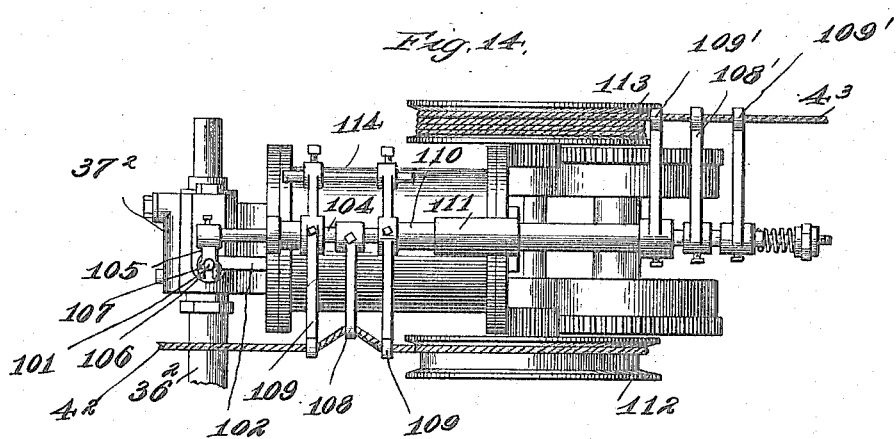
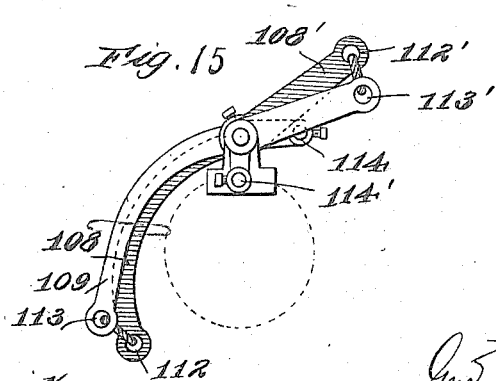

GEORGE E. WALDO AND EDWARD FAY WILSON, OF CHICAGO, ILLINOIS; SAID WILSON ASSIGNOR TO SAID WALDO.

TROLLEY-CATCHER.

1,271,106.

Specification of Letters Patent.

Patented July 2, 1918.

Application filed August 16, 1917. Serial No. 186,648.

*To all whom it may concern:*

Be it known that we, GEORGE E. WALDO and EDWARD F. WILSON, citizens of the United States, and residents of Chicago, in the county of Cook and State of Illinois, have invented a new and useful Improvement in Trolley-Catchers, of which the following is a specification.

This invention relates to trolley catchers, and relates particularly to trolley catchers adapted for operation by means of fluid under pressure.

A primary object of the invention is to provide an improved valve mechanism for controlling the admission of fluid under pressure to the cylinder of the trolley catcher.

A further object of the invention is to provide a trolley catcher adapted for operation by fluid under pressure, which will be compact and self-contained and which may readily be constructed and arranged for operating a single trolley pole or both trolley poles of a car having two trolley poles, as may be desired.

To effect the objects of the invention, our improved trolley catcher comprises the various features, combinations of features and details of construction hereinafter described and claimed.

In the accompanying drawings, in which our invention is fully illustrated,

Figure 1 is a side elevation of a trolley car equipped with a trolley catcher of our invention.

Fig. 2 is an enlarged side elevation of the motor of our improved trolley catcher.

Fig. 3 is a central longitudinal, vertical sectional view of said motor still further enlarged.

Figs. 4 and 5 are sectional views on the lines 4—4 and 5—5, respectively, of Fig. 3.

Fig. 6 is an enlarged sectional view of the means or automatic valve which controls the admission of fluid under pressure to the motor cylinder, taken on the line 6—6 of Fig. 3.

Fig. 7 is a sectional view of said valve on the line 7—7 of Fig. 6.

Figs. 8 and 9 are enlarged fragmentary detail sections on the lines 8—8 and 9—9 of Figs. 6 and 7, respectively.

Figs. 10, 11 and 12 are enlarged sectional views of the auxiliary or hand valve which controls the admission of fluid under pressure to the motor cylinder, showing said valve in different positions.

Fig. 13 is a side view of the motor of our improved trolley catcher, illustrating modified means for operating the vent valve of the main or automatic valve which controls the admission of fluid under pressure to the cylinder of the catcher.

Fig. 14 is a top plan view thereof; and

Fig. 15 is a diagrammatic end view thereof.

In the drawings we have illustrated the application of our improved trolley catcher to cars having two trolley poles, whereby both trolley poles may be operated by means of a single trolley catcher, said trolley catcher being constructed and arranged to permit either trolley pole to be drawn down into inoperative position and maintained in such depressed or inoperative position without affecting the operation of the catcher as regards the other trolley pole.

Referring now to the drawings, 1 designates the trolley wire of an overhead trolley system; 2, 2' the trolley poles mounted in any usual or approved manner at opposite ends of the trolley car, designated as a whole, by A; 3, 3' the trolley wheels mounted in the ends of said trolley poles, and 4, 4' the trolley ropes for operating the trolley poles 2, 2', respectively.

Our improved trolley catcher is adapted to be mounted in any convenient position on the car A, but, as shown, is mounted on a platform 5 suspended beneath the body of the car, preferably at about the middle thereof, by means of suitable supports rigidly connecting said platform with the under frame of the car.

Our improved trolley catcher is designed and adapted to be operated by compressed air or other fluid under pressure, and comprises a cylinder 6, a piston 7 fitted thereto, and a piston rod 8 secured in said piston, having a guide bearing in a sleeve 9 secured to and preferably formed integral with the cylinder head 10, which will be referred to hereinafter as the front cylinder head.

The trolley ropes 4, 4' are anchored to and are adapted to be wound upon sheaves 11, 11', mounted to rotate freely on a transverse shaft 12 secured in bearings formed in lugs 13, on the front cylinder head 10.

Rotation is adapted to be imparted to the sheaves 11, 11' by means of suitable driving connection between said sheaves and the piston 8, and the trolley ropes 4, 4' are wound upon their respective sheaves in such manner that rotation of said sheaves corresponding to movement of the piston 7 under the influence of fluid under pressure admitted to the cylinder 6, in the designed operation of the machine, will wind said trolley ropes upon said sheaves, and the lengths of said trolley ropes is such that when the sheaves 11, 11' are in position corresponding to full retraction of the piston 7, the trolley poles 2, 2' will be free to rise to the maximum elevation of the trolley wire 1 above the road bed.

In the preferable construction shown, the driving connection between the piston rod 8 and the sheaves 11, 11' is as follows: Formed on the piston rod 8 is a rack 14, the teeth of which mesh with the teeth of a pinion 15 secured to rotate with a shaft 16 rotatably mounted in suitable bearings 17 formed on the supporting frame of the trolley catcher, preferably in a housing 18 provided with a cored opening adapted to receive the pinion 15 and which opens laterally into the bore of the sleeve 9 to permit engagement of the teeth of said pinion with the rack teeth 14. To provide for inserting the pinion 15 into the opening in the housing 18, the outer side of said housing is formed by a removable cap 19.

Rotatably mounted, one at each side of the pinion 15, are gear wheels 20 and 20' which are operatively engaged with the shaft 16 in such manner that, when the trolley poles 2, 2' are in raised positions, rotation of said shaft through the pinion 15 corresponding to movement of the piston 7 under the influence of fluid under pressure admitted to the cylinder 6, will wind the trolley ropes 4, 4' upon the sheaves 11, 11', thus drawing down said trolley poles. The engagement of said gears 20, 20' with the shaft 16 is such also that, when the trolley poles are drawn down, rotation of the shaft 16 corresponding to movement of the piston under the influence of fluid under pressure admitted to the cylinder, will not affect the gear wheels 20, 20'.

As shown, the means for engaging the shaft 16 with the gear wheels 20, 20' consists of crank arms 21, 21', secured to rotate with the shaft 16 and which are adapted to engage pins 22, 22' secured in the gear wheels 20, 20', respectively.

As shown, the bearings for the shaft 16 are formed directly in sleeves or elongated hubs 23, 23' on the gears 20, 20', respectively, said sleeves or hubs being also provided on their outer surfaces with bearings which engage the bearings 17 on the supporting frame of the trolley catcher. In this manner, the shaft 16 and the hubs or sleeves 23, 23' will mutually support each other against any tipping or tilting stress, thus providing for the use of relatively short bearings 17 on the catcher frame.

The gear wheels 20, 20' intermesh with pinions 24, 24' secured to rotate with the sheaves 11, 11' respectively. As shown, said sheaves 11, 11' and pinions 24, 24' are rigidly connected by sleeves or bushings 25, 25', to which said sheaves and pinions are rigidly secured. As shown, the shaft 12 is secured in its bearings in the lugs 13, by collars 26, 26' secured to said shaft between which and the bearing lugs 13 the sleeves or bushings 25, 25' carrying the sheaves 11, 11' and the pinions 24, 24', respectively, are confined.

The trolley ropes 4, 4' are maintained taut when the trolley wheels are in engagement with the trolley wire and wound upon the sheaves 11, 11' when the trolley poles are drawn down into inoperative positions by suitable tension springs. As shown, said springs consist of flat spiral springs 27, 27' similar to ordinary clock springs, which, to provide for using relatively short springs, are applied to the gear wheels 20, 20', the outer ends of said springs, respectively, being connected to pins 28, 28' secured in the webs of said gear wheels, respectively, and their inner ends to the bearings 17 for the shaft 16 on the machine frame. In the preferable construction shown, also, flanges $28^a$, $28^a$ are formed on the gear wheels 20, 20', which surround the springs 27, 27' and form a housing therefor.

Assuming that the positions of the crank arms 21, 21' on the shaft 16 corresponding to full retraction of the piston 7 is that shown in dotted lines in Fig. 3, and that the positions of the pins 22, 22' in the gear wheels 20, 20' corresponding to the maximum elevation of the trolley poles—that is, the maximum height of the trolley wire 1 above the road bed,—is that indicated at $a$ in said figure, it is obvious that, the piston 7 being fully retracted, rotation of the gear wheels 20, 20', as under the influence of the springs 27, 27', is limited to slightly less than one complete revolution, that is, their rotation is limited by contact of the pins 22, 22' with the rear side of the crank arms 21, 21', or to the positions indicated at $a'$ in said Fig. 3.

Obviously, as the trolley poles are depressed below their maximum elevation, corresponding to the position $a$ of the pins 22, 22' in the gear wheels 20, 20', the tension springs 27, 27' will turn said gear wheels to wind up the trolley ropes and to maintain them under a desired tension, say two pounds, which will bring said pins a distance in advance of the crank arms 21, 21', so that if the catcher is operated under these conditions, said crank arms will engage said pins with a severe blow, which will tend to shear or break said crank arms off. To obviate this objectionable feature, it is desirable to provide means to maintain the said crank arms 21, 21' at all times in contact with the pins 22, 22' when the trolley wheels are in engagement with the trolley wire. This is preferably effected by means of a spring applied to the piston 7 and adapted to impart movement thereto in the same direction as the movement imparted to said piston by the admission of fluid under pressure to the cylinder.

As shown, said spring consists of a coiled spring 29 applied directly to the outer end of the piston rod 8, which reacts between the outer end of the piston rod bearing and a nut or collar 30 secured adjacent to the outer end of an extension 31 of said piston rod. The operative action of said spring 29 may be readily varied by adjusting the position of the collar 30 on the extension 31 of the piston rod 8.

In our improved trolley catcher of the type adapted for operating both poles of a trolley car equipped with two trolley poles, the piston travel and the sizes of the various pinions, gears and sheaves will preferably be so proportioned that the full piston travel will impart rotation to the gears 20, 20' to move the pins 22, 22' therein from the position $a$ to the position $a'$, that is, substantially through one complete revolution, and such, also, that such rotation of said gear wheels will operate to fully retract or draw down said trolley poles from their positions of maximum elevation to their fully retracted or withdrawn positions. For ordinary purposes, a desired piston travel is about six inches, from which the operative sizes of the various pinions, gears, and sheaves can be readily calculated to provide for taking up desired lengths of the trolley ropes.

Likewise, knowing the number of times the travel of the piston is multiplied, the resistance exerted by the trolley pole springs to drawing down the trolley poles and the available air pressure, the size of cylinder necessary to generate the power necessary to draw down said trolley poles can be readily calculated.

The supporting frame of our improved trolley catcher consists of a base plate 34 adapted to be secured to the platform 5, or other support, which is rigidly connected to the sleeve 9, front cylinder head 10 and housing 18, by suitable webs, said parts or elements being preferably cast integral with each other.

Where designed for operating a single trolley pole, the gear wheel 20 may be secured directly to the shaft 16 instead of through the crank arm 21 and the pin 22.

The rear end of the cylinder 6 is connected with a source of supply of fluid under pressure, as the air tank 35 (Fig. 1) which supplies the compressed air for operating the brakes of the car, by means of a service pipe 36.

The service pipe 36 and thus the admission of fluid under pressure to the cylinder 6 is controlled by a suitable valve comprising a casing 37 formed in which is a bore comprising sections 38 and 39 of different size, fitted, so as to be movable endwise in which is a plug or plunger likewise comprising sections 40 and 41 of different size, respectively fitted to the large and small sections of the bore in the valve casing.

The valve casing 37 is also provided with a chamber 42 which communicates with the small end 39 of the valve plug bore, and which is in open communication with the service pipe 36, said chamber preferably forming a relatively small, axial extension of the valve plug bore. Formed between the small section 39 of the valve plug bore and the chamber 42, is a valve seat 43, against which the end of the small section 41 of the valve plug is adapted to rest when the valve plug is at the inner limit of its movement. A suitable packing, as a leather disk or washer 44, is preferably secured to the end of said valve plug to insure a tight joint between the end of said plug and the valve seat 43. Likewise communicating with the small section 39 of the valve plug bore, preferably at a short distance, say $\tfrac{3}{8}$ of an inch, above the valve seat 43, is a passageway 45 which connects said valve plug bore with the cylinder 6. To provide for opening the passageway 45 a desired distance with a minimum movement of the valve plug, a chamber 46 is formed in the valve casing around the valve plug bore with which the passageway 45 communicates directly, and in order that the end of the valve plug and particularly the packing disk or washer 44 secured to the end thereof shall not catch on the corners formed between the valve plug bore and the chamber 46, a bushing 47 is preferably secured in the small section 39 of the valve plug bore, openings 48 being provided in said bushing to permit the passage of fluid under pressure from the valve plug bore into the chamber 46 and thence through the passageway 45 into the cylinder 6.

To prevent leakage past the valve plug when the end thereof is raised from the valve seat 43, a cup packing 49 is provided above the holes or openings 48 in the bushing 47.

To provide for inserting the valve plug into the valve plug bore, the outer end of the large section 38 of said valve plug bore opens through the end of the valve casing and is closed by a removable cap or plug 50.

The over-all length of the valve plug is made sufficiently shorter than the over-all length of the valve plug bore to permit necessary movement of said valve plug to uncover the holes or openings 48 communicating with the passageway 45. Thus, when the inner end of said valve plug is seated against the valve seat 43, a space or chamber 51 will be formed at the outer end of the valve plug bore, which is connected by means of a by-pass 52 with the chamber 42, thus providing for the admission of fluid under pressure into the chamber 51 and, the diameter of the chamber 51 being larger than the diameter of the chamber 42, it is obvious that the pressure in said chamber 51 will exert an unbalanced pressure on the valve plug adapted to hold the same closed. The small or inner end of the valve plug is adapted to be seated upon the valve seat 43 when the pressure on said valve plug is equalized, by means of a spring 53 applied to the outer end of said valve plug. As shown, said spring 53 is a coiled spring which surrounds a pin 54 secured in the end of the valve plug as a guide and which reacts against the closed outer end of the valve plug bore. In order that the resistance of the spring 53 may be substantially uniform, thus offering a substantially uniform resistance to the movement of the valve plug to open the passageway 45, said spring 53 is preferably made of considerable length, its outer end extending into a tubular extension 55 on the removable cap or plug 50 which closes the open end of the valve plug bore.

To prevent leakage from the space or chamber 51 past the valve plug, a cup packing 56 is preferably used on the large end 40 of the valve plug.

The chamber 51 is also provided with a vent passageway 57 which is maintained normally closed so long as a trolley wheel is in engagement with the trolley wire 1, by suitable means, preferably electrical means in circuit with the trolley wheel. In the preferable construction shown, said passageway 57 is controlled in the following manner:—Mounted on a suitable support adjacent to the valve casing, is an electromagnet 58 which is in electrical circuit with the trolley wheels 3. Thus, so long as either of said trolley wheels is in contact with the trolley wire 1, the magnet 58 will be energized and will become deënergized whenever both of said trolley wheels are disengaged from the trolley wire. Fitted to and freely movable lengthwise in a suitable bearing formed through the core of the magnet is a rod 59 formed on or secured to the lower end of which is a disk 60 which is adapted to engage a valve seat 61 formed around the discharge opening of the vent passageway 57 when said rod is depressed, the under side of said disk being preferably recessed and a packing pad 62, of leather or the like, being secured therein, to secure a tight joint between said vent valve and the valve seat 61. The upper end of the rod 59 projects slightly above its bearing, so that, when the magnet is energized, the armature 63 of the magnet will strike the upper end thereof and will force said rod 59 down, so that the vent valve 60 at the lower end thereof will close the discharge opening of the passageway 57 and maintain the same closed so long as the magnet is energized. A light coiled spring 64 is applied to the valve rod 59, the strength and adjustment of said spring being such that it will support or neutralize the weight of the rod 59 and of the armature 63, when the magnet is deënergized. As shown, said spring 64 is confined in a recess 65 formed by an enlargement of the bearing for the rod 59 and reacts between a rigid shoulder at the bottom of said recess and a collar 66 secured adjacent to the upper end of said rod, said collar being preferably adjustable lengthwise of said rod to provide for varying the resistance of said spring.

As shown, the armature 63 is pivoted to a suitable fixed support and is always maintained in the magnetic field by a tail piece 67 thereon which is adapted to strike a rigid stop and thus limit the pivotal movement of said armature away from the poles of the magnet.

With the described construction, it is obvious that, the service pipe 36 being open to the chamber 42 and the vent valve 60 closed, the chamber 42, the by-pass 52, the chamber 51 and the vent passage 57 will all be filled with fluid under pressure, and that, owing to the larger size of the section 40 of the valve plug which is exposed in the chamber 51, as compared with the section 41 thereof, an unbalanced pressure will be exerted on said valve plug which will hold the inner end thereof in close engagement with the valve seat 43, whereby fluid under pressure will be prevented from entering the cylinder 6. It is also obvious that in case the pressure in the chamber 51 is sufficiently reduced an unbalanced pressure will be created on the inner end of the valve plug, which will operate to move said valve plug endwise to uncover the holes or openings 48 in the bushing 47 and thus permit fluid under pressure to pass freely from the service pipe to the cylinder 6, thereby operating the catcher.

To secure the desired difference in pressure in the chambers 42 and 51 to operate the valve, the vent passage 57 is made sufficiently larger than the by-pass 52 so that the fluid under pressure in the chamber 51 will exhaust almost instantly to substantially atmospheric pressure when the vent valve 60 is opened.

With an average pressure of say 70 pounds, which is approximately the pressure available on trolley cars, desired quickness of operation is obtained with the operative diameter of the by-pass 52 about $\frac{1}{32}$ of an inch, and the operative diameter of the vent passage 57 about $\frac{1}{16}$ of an inch, depending upon the rapidity with which it is desired to have the catcher operate. To meet varying conditions, however, it may be desirable to vary the operative diameters of said by-pass and vent passage. This end we accomplish in a simple and effective manner, as follows:

Said by-pass 52 and vent passage 57 are made of any desired size to permit the fluid under pressure to pass freely through the same. Seated in suitable bearings formed, as shown, by enlarged sections of said by-pass and vent passage, are bushings 68, 68', which are confined in their respective bearings by screw plugs 69, 69'. Formed in the bushings 68, 68' are holes or openings of different sizes which are adapted to connect the sections of said by-pass and vent passage, respectively, on different sides of said bushings. As shown, said bushings are provided with holes 70, 70', which extend lengthwise of the same and are in open and continuous communication with one section of said by-pass and vent opening, respectively. Said bushings are also provided with holes or openings 71, 71', which open laterally through the same into the longitudinal holes or openings 70, 70'. Said holes or openings 71, 71' are of different sizes, the holes 71 ranging from about .02 to .05 of an inch in diameter, and the holes 71' from about .05 to .16 of an inch, and said holes 71, 71' are adapted to be brought into communication with the sections of said by-pass and vent passage, other than those with which the holes or openings 70, 70' communicate. As shown, there are four each of the holes or openings 71, 71'. The bushings 68, 68' may be secured in positions with any one of the holes 71, 71' in communication with said by-pass and vent passage, respectively, by any suitable means, as shown, by pins 72, 72' secured in the ends of said bushings, which are adapted to engage and which are interchangeable in holes 73, 73' formed in the inner ends of said bearings, respectively.

Obviously, the magnet 58 will have to be of sufficient strength when energized, to maintain the vent valve 60 closed against the fluid pressure exerted thereon through the discharge opening of the vent passage 57, and to provide for using a magnet of minimum size and strength, said discharge opening is made as small as possible, the only limitations to its size being that it shall be sufficiently large to produce a fluid pressure on the vent valve 60 sufficient to insure the opening of said vent valve when the magnet 58 is deënergized, and at least equal in size to the hole 71' in the bushing 68' which connects the sections of said vent passage at any given time.

In order to vary the size of the discharge opening from the vent passage 57, to meet the varying conditions as to available fluid pressure and the like, the discharge opening of said vent passage 57 is preferably formed in a nipple 74 secured in position in such manner that it may be readily removed and replaced by another nipple having a discharge opening of different size, if desired.

In order to render the entire catcher compact and self-contained, the valve casing 37, the magnet 58 and the armature 63 are mounted directly on the rear head of the cylinder 6, the valve casing being made separate therefrom and bolted or otherwise secured thereto, the magnet 58 being mounted on a bracket 75 preferably formed integral with said cylinder head and the armature 63 being pivoted to a lug 76, likewise formed integral with said cylinder head.

As shown, the magnet 58 is secured in position upon the bracket 75 by a stud bolt 77 which extends through an axial hole or opening in said magnet and is secured in a suitable hole formed in the bracket 75 by a clamping nut threaded to the end thereof beneath said bracket, said stud bolt and magnet being provided with engaging shoulders, whereby tightening the clamping nut on said stud bolt will draw said magnet into strong engagement with the bracket 75. The bearing for the valve stem 59 and the recess for the spring 64 are formed directly in the stud bolt 77.

To avoid creating an air pressure in the cylinder 6 and also at the inner end of the larger section 40 of the valve plug by leakage past said valve plug, vent openings 78 and 79 are provided, the vent 78 connecting the cylinder 6 with the valve plug bore and the vent 79 connecting the valve plug bore with the outer air. To permit fluid under pressure to pass freely from the vent 78 to the vent 79, the outer surface of the small section 41 of the valve plug is recessed or cut out, as shown at 80, for a distance below the inner end of the larger section 40 thereof, the positions of said vents being such that when the valve is closed, the vent 79 will communicate with the chamber formed by the cut out portion of the valve plug, but will be closed by or will be entirely below the cup packing 49 when said valve is open. Thus, while the vents 78 and 79 will prevent the accumulation of fluid under pressure in the cylinder 6 when the main valve is closed, the vent 78 will be closed when said main valve is open, thereby preventing all loss and waste of fluid under pressure through said vent opening during the operation of the device.

In addition to the main controlling valve heretofore described, the service pipe 36 is controlled by a second valve or valves, preferably two-way valves adapted for manual operation, the openings of said valves being so positioned (Figs. 10, 11 and 12), that when said valves are turned in one direction to close the service pipe, they will also vent the cylinder 6, thus rendering the trolley catcher passive and permitting the trolley wheels to be readjusted to the trolley wire in the usual manner without resistance from said trolley catcher; but by turning said valves in the opposite directions they may be closed without venting the cylinder.

For convenience of operation, two such valves, designated 81, 81', respectively, are provided, said valves being located, respectively, in separate branches 82, 82' of the service pipe 36. Said branches preferably extend adjacent to opposite ends of the car, respectively, and the valves 81, 81' therein are preferably located so as to be accessible for convenient operation by the conductor or motorman standing on the platforms of the car. In practice, one of said valves is usually kept closed, being turned in proper direction to close the service pipe without venting the cylinder, whereby "cutting out" the catcher involves merely the closing of the other valve.

With the described construction it is obvious that movement of the piston 7 under the influence of fluid under pressure admitted to the cylinder 6 will be adapted to draw down both trolley poles. Ordinarily, however, only one trolley pole is used at a time, the other pole being drawn down and secured substantially flat against the top of the car, suitable hooks being preferably provided for securing said trolley poles in depressed condition when not in use.

For purposes of convenient reference, the automatic valve secured to the cylinder head is designated "the main valve" in the claims, the valves 81, 81' "cut-out valves", and the valve which controls the vent passage 57, the "vent valve."

When the cut-out valves 81, 81' are turned in proper direction to close the service pipe and also to vent the cylinder, the spring 53 will force the valve plug inwardly into engagement with the valve seat 43 and, when said valves 81, 81', or either of them, are opened to reset the catcher, the fluid under pressure, entering the chamber 42, will tend to open the main valve and thus again operate the catcher. Under any conditions, this could be avoided by opening the cut-out valves slowly, thus permitting the pressure to equalize in the chambers 42 and 51. The objection can, however, be entirely overcome by locating the valve seat 43 a sufficient distance from the holes 48, so that lifting of the valve plug will compress the fluid in the chamber 51 to equalize the pressure on opposite ends of the valve plug before said holes or ports 48 are uncovered by the valve plug and, as the air pressure in said chamber 51 increases, the valve plug will be again forced down into engagement with its seat 43. With the described construction, it is obviously immaterial whether said valve be opened quickly or slowly.

Any skilled electrician can readily make the necessary electrical connections, insulations, current reductions, etc., for carrying out our invention, and they need not, therefore, be shown and described in detail. Attention is, however, called to the fact that in order that the car motors may be shut off without affecting the trolley catchers, said electrical connections will comprise a shunt circuit or circuits around the controller or controllers of the motor or motors.

In Figs. 13 to 15 of the drawings, we have shown a vent valve constructed and arranged for operation by purely mechanical means, as distinguished from the electrical means heretofore described.

Referring to said Figs. 13 to 15, $6^2$ designates the cylinder of the trolley catcher, $11^2$, $11^3$ the sheaves on which the trolley ropes $4^2$ and $4^3$ are wound, respectively, and $37^2$ the casing of the main valve which controls the service pipe $36^2$, the vent passage of which is controlled by a valve 100 having a valve stem 101 fitted to and movable lengthwise in suitable bearings formed in lugs 102 on the rear head of the cylinder $6^2$.

Said valve 100 is adapted to be maintained normally closed by means of a spring 103 applied thereto and is operatively connected with the trolley poles in such manner that the trolley poles will be free to follow gradual variations in the height of the trolley wire above the track, but sudden upward movement of said poles, as when they leave the trolley wire, will operate to open said vent valve 100. As shown, the connection between the trolley poles and said valve is as follows: Mounted in suitable bearings, preferably formed directly on the cylinder $6^2$, and extending lengthwise of said cylinder, is a rock shaft 104, secured to the rear end of which is an arm 105 which is connected to the stem 101 of said valve 100, said connection consisting, preferably, of a fork 106 formed in the end of said arm which extends beneath a rigid part of or projection on said valve stem, as shown, a transverse pin 107 secured in the valve stem 101.

Secured to rotate with the rock shaft 104, one for each sheave $11^2$, $11^3$, are arms 108, 108', said arms being preferably secured to said rock shaft by set screws or other means so as to be adjustable thereon, and secured in fixed position, one adjacent to each arm 108, 108', are arms or supports 109, 109'. As shown, said arms 109, 109' are supported on a sleeve 110 rigidly secured in a lug 111 mounted in fixed position on the cylinder 6², said sleeve also forming the bearing for the rock shaft 104.

Formed in the ends of the arms 108, 108' are eyes 112, 112', and formed on the arms 109, 109' are eyes 113, 113' preferably arranged in pairs one at each side of the eyes 112, 112'. As shown, the arms 109, 109' are likewise in pairs, arranged one at each side of the arms 108, 108', and are rigidly connected preferably in such manner as to be adjustable toward and from the arms 108, 108', so as to provide longer or shorter spaces between said pairs of arms 109, 109' and the arms 108, 108' mounted between said pairs of arms, respectively. This may be effected in a simple manner by rigidly securing one of each pairs of arms 109, 109' to the sleeve 110 and providing a hole or opening in the other of said pairs of arms 109, 109', through which the rock shaft 104 passes freely, and rigidly connecting the arms of each pair by means of a suitable adjustable connection. As shown, said connection consists of rods 114, 114' adjustably secured in suitable holes or openings formed in rearward extensions of said arms, as by set screws or the like.

The arms 109, 109' are secured in such positions that the eyes 113, 113' in said arms will be substantially in line with each other, being preferably directly in line with the trolley ropes 4², 4³, as they leave the sheaves 11², 11³, and the arms 108, 108' are secured to the rock shaft 104 in such positions that the eyes 112, 112' therein will be out of line with the eyes 113, 113' in the pairs of arms 109, 109', when the valve 100 is closed, the relation being such that movement of either of the arms 108, 108' to bring the eyes 112, 112' therein into line with the eyes 113, 113' in said arms 109, 109', will open said valve 100 and thus operate the retriever.

The connection between the trolley poles and the vent valve 100 is through the medium of the trolley ropes 4², 4³ which pass through the eyes 113, 113' in the arms 109, 109' and between said eyes through the eyes 112, 112' in the arms 108, 108'.

The tension of the spring 103 is so adjusted that it will hold the arms 108, 108' against movement due to the tension of the trolley ropes when in engagement with the trolley wire and will permit said trolley ropes to follow variations in the elevation of said trolley wire without turning said arms, but will permit said arms 108, 108' to turn when the trolley ropes 4², 4³ are suddenly subjected to the full tension of the trolley pole springs—approximately 30 to 50 pounds—as when the trolley wheels run off from the trolley wire, before the tension of said trolley ropes overcomes the inertia of the connections between the sheaves 11², 11³ and the piston fitted to the cylinder 6² and the friction of the parts.

With the described construction it is obvious that the vent valve 100 will remain closed as long as a trolley wheel is in engagement with the trolley wire, but that, when the trolley wheel runs off from the trolley wire, the trolley rope attached thereto will operate to turn the arm 108, 108' through which said rope passes, thus imparting corresponding rotation to the rock shaft 104 and opening the vent valve 100, and thus operating the trolley catcher.

We claim:—

1. In a trolley catcher, the combination of a cylinder, a piston fitted thereto, a piston rod secured in said piston, and operative connection between said piston and the trolley pole, said connection comprising a rack on the piston rod, a shaft, a pinion secured to rotate therewith which meshes with the rack on said piston rod, a gear wheel, driving connection between said pinion shaft and said gear wheel constructed and arranged to permit limited rotation of said gear wheel independently of said shaft, the relation being such that when said gear wheel is in position corresponding to less than full advancement of the piston, movement of said piston to full advancement will impart rotation to said gear wheel, and the relation being such also that when said gear wheel is in position corresponding to full advancement of said piston, it will be unaffected by movement of said piston, substantially as described.

2. In a trolley catcher, the combination of a cylinder, a piston fitted thereto, a piston rod secured in said piston, and operative connection between said piston and the trolley pole, said connection comprising a rack on the piston rod, a shaft, a pinion secured to rotate therewith which meshes with the rack on said piston rod, a gear wheel, driving connection between said pinion shaft and said gear wheel constructed and arranged to permit limited rotation of said gear wheel independently of said shaft, the relation being such that when said gear wheel is in position corresponding to less than full advancement of the piston, movement of said piston to full advancement will impart rotation to said gear wheel, and the relation being such also that when said gear wheel is in position corresponding to full advancement of said piston, it will be unaffected by movement of said piston, and a tension spring applied to said gear wheel, substantially as described.

3. In a trolley catcher, the combination of a cylinder, a piston fitted thereto, a piston rod secured in said piston, and operative connection between said piston and the trolley pole, said connection comprising a rack on the piston rod, a shaft, a pinion secured to rotate therewith which meshes with the rack on said piston rod, a gear wheel mounted to rotate on said pinion shaft, an arm on said shaft and a pin in said gear wheel which projects into the path of travel of said arm, substantially as described.

4. In a trolley catcher, the combination of a cylinder, a piston fitted thereto, a piston rod secured in said piston, and operative connection between said piston and the trolley pole, said connection comprising a rack on the under side of the piston rod, a shaft which extends transversely beneath said piston rod, a pinion secured to rotate with said shaft which meshes with the rack on said piston rod, a gear wheel mounted to rotate on said pinion shaft, an arm on said pinion shaft, a pin in said gear wheel which projects into the path of travel of said arm, a rotatable sheave, and a pinion secured to rotate with said sheave and which meshes with said gear wheel, substantially as described.

5. In a trolley catcher, the combination of a cylinder, a piston fitted thereto, a piston rod secured in said piston, and operative connection between said piston and the trolley pole, said connection comprising a rack on the under side of the piston rod, a shaft which extends transversely beneath said piston rod, a pinion secured to rotate with said shaft which meshes with the rack on said piston rod, a gear wheel mounted to rotate on said pinion shaft, an arm on said pinion shaft, a pin in said gear wheel which projects into the path of travel of said arm, a rotatable sheave located between said gear wheel and the cylinder, and a pinion secured to rotate with said sheave and which meshes with said gear wheel, substantially as described.

6. In a trolley catcher, the combination of a cylinder, a piston fitted thereto, a piston rod secured in said piston, and operative connection between said piston and the trolley pole, said connection comprising a rack on the under side of the piston rod, a shaft which extends transversely beneath said piston rod, a pinion secured to rotate with said shaft, a gear wheel mounted to rotate on said pinion shaft, an arm on said pinion shaft, a pin in said gear wheel which projects into the path of travel of said arm, a sheave rotatably mounted between said gear wheel and the cylinder the axis of which extends over the piston rod, and a pinion secured to rotate with said sheave and which meshes with said gear wheel, substantially as described.

7. In a trolley catcher, the combination of a motor and means for connecting said motor to two trolley poles and for operating said poles separately, substantially as described.

8. In a trolley catcher, the combination of a cylinder, a piston fitted thereto, and means for connecting said piston with two trolley poles and for operating said poles separately, substantially as described.

9. In a trolley catcher, the combination of a motor, means for connecting said motor with two trolley poles and for operating said trolley poles separately, and means for maintaining said connecting means under tension, substantially as described.

10. In a trolley catcher, the combination of a cylinder, a piston fitted thereto, a piston rod secured in said piston, and operative connections between said piston rod and the trolley poles of a trolley car equipped with two trolley poles, said connections comprising a rack on said piston rod, a shaft, a pinion secured to rotate therewith which meshes with the rack on the pinion shaft, rotatable gear wheels, and means connecting said pinion shaft and gear wheels for rotating said gear wheels separately and for permitting said gear wheels to rotate independently of said pinion shaft, substantially as described.

11. In a trolley catcher, the combination of a cylinder, a piston fitted thereto, a piston rod secured in said piston, and operative connections between said piston rod and the trolley poles of a trolley car equipped with two trolley poles, said connections comprising a rack on said piston rod, a shaft, a pinion secured to rotate therewith which meshes with the rack on the piston rod, gear wheels rotatably mounted on said pinion shaft, means connecting said pinion shaft and gear wheels for rotating said gear wheels separately and for permitting said gear wheels to rotate independently of said pinion shaft, and springs applied to said gear wheels for rotating the same, substantially as described.

12. In a trolley catcher, the combination of a cylinder, a piston fitted thereto, a piston rod secured in said piston, and operative connections between said piston rod and the trolley poles of a trolley car equipped with two trolley poles, said connections comprising a rack on said piston rod, a shaft, a pinion secured to rotate therewith which meshes with the rack on the piston rod, rotatable gear wheels, arms secured to said pinion shaft, pins secured in said gear wheels which respectively project into the paths of travel of different arms on said pinion shaft, substantially as described.

13. In a trolley catcher, the combination of a cylinder, a piston fitted thereto, a piston rod secured in said piston, and operative connections between said piston rod and the trolley poles of a car having two trolley poles, said connections comprising a rack on the under side of said piston rod, a shaft which extends transversely beneath said piston rod, a pinion secured to rotate with said shaft and which meshes with the rack on said piston rod, gear wheels rotatably mounted on said pinion shaft, driving connections between said pinion shaft and said gear wheels constructed and arranged to permit rotation of said gear wheels independently of said pinion shaft, a rod mounted transversely in bearings on the cylinder head, sheaves rotatably mounted on said rod, pinions secured to rotate with said sheaves, respectively, and which mesh with different gear wheels, substantially as described.

14. In a trolley catcher, the combination of a cylinder, a piston fitted thereto, a piston rod secured in said piston, and operative connections between said piston rod and the trolley poles of a trolley car equipped with two trolley poles, whereby movement of said piston under the influence of fluid under pressure admitted to said cylinder is adapted to separately retract both of said trolley poles, said connections comprising a rack on said piston rod, a shaft, a pinion secured to rotate therewith which meshes with the rack on the piston rod, gear wheels rotatably mounted on said pinion shaft, driving connections between said pinion shaft and said gear wheels, constructed and arranged to permit rotation of said gear wheels independently of said pinion shaft, rotatable sheaves, pinions secured to rotate with said sheaves respectively, and which mesh with different gear wheels, and tension springs applied to said gear wheels, substantially as described.

15. In a trolley catcher, the combination of a cylinder, a piston fitted thereto, a piston rod secured in said piston, and operative connections between said piston rod and the trolley poles of a trolley car equipped with two trolley poles, whereby movement of said piston under the influence of fluid under pressure admitted to said cylinder is adapted to separately retract both of said trolley poles, said connections comprising a rack on said piston rod, a shaft, a pinion secured to rotate therewith which meshes with the rack on the piston rod, gear wheels rotatably mounted on said pinion shaft, driving connections between said pinion shaft and said gear wheels, constructed and arranged to permit rotation of said gear wheels independently of said pinion shaft, rotatable sheaves, pinions secured to rotate with said sheaves respectively, and which mesh with different gear wheels, tension springs applied to said gear wheels, and a spring applied to said piston adapted for advancing the same, substantially as described.

16. A trolley catcher of the type described, the cylinder and operative connections of which are mounted on a frame comprising a supporting base, a cylinder head, a sleeve on said cylinder head, and webs connecting said base with said cylinder head and sleeves, substantially as described.

17. A trolley catcher of the type described, the cylinder and operative connections of which are mounted on a frame comprising a supporting base, cylinder heads, a sleeve on one of said cylinder heads, webs connecting said base with said cylinder head and sleeve, and a main valve and controlling mechanism therefor mounted on the other cylinder head, substantially as described.

18. In a trolley catcher, of the type described, the combination of the cylinder, a pipe adapted for connecting said cylinder with a source of supply of fluid under pressure, a main valve which controls said supply pipe constructed and arranged to be opened by the fluid pressure in said supply pipe, means controlled by engagement of the trolley wheel with the trolley wire for maintaining said valve closed, means for reseating said valve when the pressure thereon is relieved, and a hand operated valve which controls said fluid supply pipe, substantially as described.

19. In a trolley catcher of the type described, the combination of the cylinder, a pipe adapted for connecting said cylinder with a source of supply of fluid under pressure, a main valve which controls said supply pipe constructed and arranged to be opened by the fluid pressure in said supply pipe, means controlled by engagement of the trolley wheel with the trolley wire for maintaining said valve closed, and means for retarding the opening of said main valve under the fluid pressure in the supply pipe, substantially as described.

20. In a trolley catcher of the type described, the combination of the cylinder, a pipe adapted for connecting said cylinder with a source of supply of fluid under pressure, a main valve which controls said supply pipe, said valve comprising a casing provided with a valve bore, a valve plug fitted to and movable endwise in said valve bore, said valve bore and valve plug both comprising corresponding sections of different sizes, said valve casing also being provided with a chamber in which the smaller end of said valve plug is exposed and which communicates with the fluid supply pipe, a passageway which connects said chamber with the larger section of said valve bore adjacent to its outer end, and with a vent passage, a vent valve which controls said vent passage, and means controlled by engagement of the trolley wheel with the trolley wire for maintaining said vent valve closed, substantially as described.

21. In a trolley catcher of the type described, the combination of the cylinder, a pipe adapted for connecting said cylinder with a source of supply of fluid under pressure, a main valve which controls said supply pipe, said valve comprising a casing provided with a valve bore, a valve plug fitted to and movable endwise in said valve bore, said valve bore and valve plug both comprising corresponding sections of different sizes, said valve casing also being provided with a chamber in which the smaller end of said valve plug is exposed and which communicates with the fluid supply pipe, a passageway which connects said chamber with the larger section of said valve bore adjacent to its outer end, and with a vent passage, a vent valve which controls said vent passage, and means controlled by engagement of the trolley wheel with the trolley wire for maintaining said vent valve closed, said chamber in which the smaller end of said valve plug is exposed forming an extension of and being smaller than the smaller section of said valve bore, and a valve seat at the end of said valve bore which surrounds the open end of said chamber, and upon which the smaller end of the valve plug is adapted to bear, substantially as described.

22. In a trolley catcher of the type described, the combination of the cylinder, a pipe adapted for connecting said cylinder with a source of supply of fluid under pressure, a main valve which controls said supply pipe, said valve comprising a casing provided with a valve bore, a valve plug fitted to and movable endwise in said valve bore, said valve bore and valve plug both comprising corresponding sections of different sizes, said valve casing also being provided with a chamber in which the smaller end of said valve plug is exposed and which communicates with the fluid supply pipe, a passageway which connects said chamber with the larger section of said valve bore adjacent to its outer end, and with a vent passage, a vent valve which controls said vent passage, and means controlled by engagement of the trolley wheel with the trolley wire for maintaining said vent valve closed, said chamber in which the smaller end of said valve plug is exposed forming an extension of said valve bore, and a valve seat at the end of said valve bore which surrounds the open end of said chamber, and upon which the smaller end of the valve plug is adapted to bear, said valve casing being provided with a passageway which communicates with the cylinder of the catcher and which opens into the valve bore at a distance from the valve seat at the end thereof, substantially as described.

23. In a trolley catcher of the type described, the combination of the cylinder, a pipe adapted for connecting said cylinder with a source of supply of fluid under pressure, a main valve which controls said supply pipe, said valve comprising a casing provided with a valve bore, a valve plug fitted to and movable endwise in said valve bore, said valve bore and valve plug both comprising corresponding sections of different sizes, said valve casing also being provided with a chamber in which the smaller end of said valve plug is exposed and which communicates with the fluid supply pipe, a passageway which connects said chamber with the larger section of said valve bore adjacent to its outer end, and with a vent passage, a vent valve which controls said vent passage, means controlled by engagement of the trolley wheel with the trolley wire for maintaining said vent valve closed, and a spring applied to said valve plug adapted for reseating the same, substantially as described.

24. In a trolley catcher of the type described, the combination of the cylinder, a pipe adapted for connecting said cylinder with a source of supply of fluid under pressure, a main valve which controls said supply pipe, said valve comprising a casing provided with a valve bore, a valve plug fitted to and movable endwise in said valve bore, said valve bore and valve plug both comprising corresponding sections of different sizes, said valve casing also being provided with a chamber in which the smaller end of said valve plug is exposed and which communicates with the fluid supply pipe, a passageway which connects said chamber with the larger section of said valve bore adjacent to its outer end, and with a vent passage, a vent valve which controls said vent passage, and electrical means controlled by engagement of the trolley wheel with the trolley wire for closing said vent valve and for maintaining same closed, substantially as described.

25. In a trolley catcher of the type described, the combination of the cylinder, a pipe adapted for connecting said cylinder with a source of supply of fluid under pressure, a main valve which controls said supply pipe, said valve comprising a casing provided with a valve bore, a valve plug fitted to and movable endwise in said valve bore, said valve bore and valve plug both comprising corresponding sections of different sizes, said valve casing being also provided with a chamber in which the smaller end of said valve plug is exposed and which communicates with the fluid supply pipe, a passageway which connects said chamber with the larger section of said valve bore adjacent to its outer end, and with a vent passage, a vent valve which controls said vent passage, means for varying the operative sizes of said supply and vent passages of said chamber, and means controlled by engagement of the trolley wheel with the trolley wire for maintaining said vent valve closed, substantially as described.

26. In a trolley catcher of the type described, the combination of the cylinder, a pipe adapted for connecting said cylinder with a source of supply of fluid under pressure, a main valve which controls said supply pipe, said valve comprising a casing provided with a valve bore, a valve plug fitted to and movable endwise in said bore, said valve bore and valve plug both comprising corresponding sections of different sizes, said valve casing being also provided with a chamber in which the smaller end of said valve plug is exposed and which communicates with the fluid supply pipe, a passageway which connects said chamber with the larger section of said valve bore adjacent to its outer end, and with a vent passage, means for varying the operative sizes of said supply and vent passages, either or both, said means comprising bushings seated in enlarged sections of said passageways, respectively, provided with holes of different sizes adapted to be brought into communication with the sections of said passageways at different sides of said bushings by varying the positions of said bushings in their respective seats, and means for securing said bushings in different positions in their seats, and means controlled by engagement of the trolley wheel with the trolley wire for maintaining said vent valve closed, substantially as described.

27. In a trolley catcher of the type described, the combination of the cylinder, a pipe adapted for connecting said cylinder with a source of supply of fluid under pressure, a main valve which controls said supply pipe constructed and arranged to be held closed by fluid pressure in a chamber formed in said valve casing, provided with a passageway by which it communicates with the supply pipe and with a vent passage, a vent valve which controls said vent passage, and electrical means for maintaining said valve closed, said means comprising an electromagnet in circuit with the trolley wheel the core of which is provided with an axial bore, a stem on said vent valve which extends through and is slidably fitted to the bore in the core of the magnet, whereby, when the magnet is energized, the armature thereof will strike the projecting end of said valve stem and will close said valve and maintain the same closed, substantially as described.

In testimony that we claim the foregoing as our invention, we affix our signatures this 13th day of August, A. D. 1917.

GEO. E. WALDO.
EDWARD FAY WILSON.

Copies of this patent may be obtained for five cents each, by addressing the "Commissioner of Patents. Washington, D. C."